United States Patent [19]

Asahara et al.

[11] Patent Number: 4,844,589
[45] Date of Patent: Jul. 4, 1989

[54] LENSES HAVING PLURAL CONTIGUOUS REFRACTIVE INDEX DISTRIBUTION SUBSTRATES AND METHOD OF MANUFACTURE

[75] Inventors: Yoshiyuki Asahara; Hiroyuki Sasai, both of Tokyo; Shigeaki Omi, Saitama; Seiichi Shingaki; Shin Nakayama, both of Tokyo, all of Japan

[73] Assignee: Hoya Corporation, Tokyo, Japan

[21] Appl. No.: 166,812

[22] Filed: Feb. 29, 1988

Related U.S. Application Data

[63] Continuation of Ser. No. 754,740, Jul. 15, 1985, abandoned.

[30] Foreign Application Priority Data

Jul. 17, 1984 [JP] Japan ................. 59-146913
Jul. 17, 1984 [JP] Japan ................. 59-146914

[51] Int. Cl.$^4$ ................................................. G02B 6/00
[52] U.S. Cl. ................................ 350/413; 350/96.31
[58] Field of Search ................... 65/30.13, 31, 37, 38, 65/40; 350/413, 96.31

[56] References Cited

U.S. PATENT DOCUMENTS

| | | | |
|---|---|---|---|
| 4,108,622 | 8/1978 | Martin | 65/30.13 |
| 4,168,113 | 9/1979 | Chang et al. | 65/30.13 |
| 4,203,744 | 5/1980 | Schultz et al. | 65/3.11 |
| 4,397,667 | 8/1983 | Morimoto et al. | 65/30.13 |
| 4,400,052 | 8/1983 | Alferness et al. | 65/30.13 |
| 4,462,662 | 7/1984 | Lama | 350/96.31 |
| 4,563,205 | 1/1986 | Asahara et al. | 65/30.13 |

FOREIGN PATENT DOCUMENTS

| | | | |
|---|---|---|---|
| 58-95623 | 6/1983 | Japan | 65/30.13 |
| 59-35042 | 2/1984 | Japan | 65/30.13 |
| 59-137348 | 8/1984 | Japan | 65/30.13 |
| 2102145 | 1/1983 | United Kingdom | 65/30.13 |

Primary Examiner—Bruce Y. Arnold
Assistant Examiner—Rebecca D. Gass
Attorney, Agent, or Firm—Cushman, Darby & Cushman

[57] ABSTRACT

Refractive index distribution lenses may be made by forming refractive index distribution patterns in surfaces of two substrates. The patterns in the two substrates are made to be matching. Then, these surfaces of the two substrates are placed together with the patterns in the substrates coinciding. If the refractive index distribution patterns in the surfaces form semicylindrical lenses with parallel axes, the substrates may be put together so that the axes of the lenses in one substrate coincide with corresponding axes of semicylindrical lenses in the other substrate to form a rod lens array. If the refractive index distribution patterns in the two substrates are constant in directions parallel to the surfaces of these substrates but vary in the direction perpendicular to the surfaces, the surfaces of these substrates may be put together to form a slab lens.

3 Claims, 6 Drawing Sheets

LENSES HAVING PLURAL CONTIGUOUS REFRACTIVE INDEX DISTRIBUTION SUBSTRATES AND METHOD OF MANUFACTURE

This is a continuation of application Ser. No. 754,740, filed July 15, 1985, which was abandoned upon the filing thereof.

BACKGROUND OF THE DISCLOSURE

1. Field of the Invention

The present invention relates to lenses having refractive index distribution patterns and methods of manufacturing the same.

2. Description of the Prior Art

In optical fiber communication systems, it is important to couple a light source such as a semiconductor laser or a light emitting diode (LED), to a light transmitting medium, such as an optical fiber, as efficiently, as possible. To improve efficiency light from a light source is focused onto the optical fiber using an optical element such as a lens, or the like. Typically, a spherical lens, a cylindrical lens, a focusing rod lens of the gradient refractive index type, or a combination thereof have been used as the optical element.

Among those optical elements, the cylindrical lens is effective to collimate light from a light source and focusing light in only in one direction. This is particularly useful with a semiconductor laser in which the angular range over which light leaves the laser depends on the direction. However, a simple cylindirical lens cannot completely collimate light from the light source because of aberration. Therefore, attempts have been made to improve cylindrical lenses. For example, the applicants of this application have proposed in Japanese patent application No. 16109/1983 a slab-like lens body 10 (see FIG. 1) having a refractive index gradient 12 only along its thickness. That is, as illustrated in FIG. 2, the resulting lens (hereinafter referred to as a slab lens) has a refractive index distribution in which the refractive index n(t), in the direction of thickness (see the left portion of FIG. 2), changes substantially in accordance with the expression $$n(t)^2 = n_o(1 - g^2 t^2)$$

where t represents a half of the thickness of the slab, $n_o$ the refractive index of the slab center, and g the second order constant of the distribution. The right portion of FIG. 2 illustrates that the refractive index is uniform along the directions of length and width. The resulting lens may be placed to provide correction only in the direction in which the radiation angle is large as shown in FIG. 3. This slab lens, however, has a value of g, calculated according to the above-mentioned equation, of approximately $g = 0.1$ mm$^{-1}$ with a thickness of 3.6 mm and the numerical aperture NA becomes 0.26–0.30. Accordingly, as shown in FIG. 3, for example, it is difficult to correct a maximum radiation angle of 50 to 60 degrees (NA: 0.77–0.87) of a semiconductor laser 14 when a beam 16 emitted from semiconductor laser 14 is transformed by slab-lens 18 into corrected beam 20. Further, even if a lens is produced by an ordinary ion exchanging method in which a glass plate containing a high refractive index component is immersed in fused salt so as to perform ion-exchanging with respect to the high refractive index ions in the glass plate, it is possible to obtain a high numerical aperture NA = 0.5–0.6 and a usual numerical aperture NA = 0.35–0.46 in the same manner as in the case of the rod-like lens of the refractive index distribution type. As apparently seen in the embodiment shown in Japanese patent publication No. 37731/1973, the largest refractive index difference in the refractive index distribution is never over 0.08.

In the conventional slab lens, the refractive index may be changed along the thickness, but the numerical aperture is low and the largest refractive index difference is about 0.08.

In order to enlarge refractive index difference, the following method has been proposed. A mask layer is formed on a transparent substrate by photolithography and dopant ions are selectively poured through small bores in the mask layer, thereby producing semispherical lenses of the gradient refractive index distribution. In a planar microlens body obtained through diffusion from surfaces in the manener as described above (hereinafter referred to as a surface diffusion method), the refractive index difference between the central portion and the circumferential portion becomes large, and is about 0.2, but the numerical aperture of the lens, when the lens is used alone, is when the lens is used alone.

Further, Japanese patent application Laid-Open No. 106503/1983, discloses a technique where a mask layer 22 is provided with an opening slit portion 24 having a predetermined shape formed on a transparent substrate 26 as shown in FIG. 4. Ions are diffused through opening 24 so as to form a semicylindrical lens portion corresponding to a gradient refractive index distribution 28 which is used as a unidirectional refractive index distribution type lens, similar to a cylindrical lens. In this case, however, there has been a problem in that the numerical apertures is only about 0.3 at largest.

Also, as electronic copying machines have become reduced in size, a rod lens array 30 (see FIG. 5) including a number of rod type light condensing lenses 32 have been used as an imaging optical system. Rod type light condensing lenses 32 are obtained by pouring a solution of dopant into apertures of, for example, a porous glass body. A portion of the dopant is then removed from the glass body to form a density gradient in the dopant distribution in the aperture. The glass body is dried and then subject to baking to thereby crush the apertures (Japanese patent application Laid-Open No. 12607/1976).

Each of light condensing lenses 32 has a refractive index distribution which decreases in a radial direction gradually in proportion to the square of the distance from a rod central axis 34 (see FIG. 6). The lens length $Z_O$ is from ½ to ¾ of the distance in which the light within the lens system produces the erect real image of an object as shown in FIG. 7.

In order to form a lens array by using a rod type light condensing lenses 32, the lenses are stacked two of three deep as shown in FIG. 8, aligned in one direction, and sandwiched between upper and lower plates 36. Each rod type light condensing lens 32 has an imaging (focusing) conjugate length T (see FIG. 7) defined as the sum of the distance $S_1$, between one end surface of lens 32 and an object 38, the distance $S_2$ between the other end of lens 32 and an erect real image 40, and the length $Z_O$ of lens 32. The conjugate length T depends on the value of g, representing a quadratic constant of the distribution when the numerical aperture NA of the lens or the refractive index distribution of the lens is approximated as follows:

$$n(r)^2 = n_o^2(1-g^2r^2)$$

where $n_o$ represents the refractive index on the central axis of a rod type glass body, and $n(r)$ represents the refractive index at the position of the radius r from the central axis. There is an advantage in that as the numerical aperture or the value of g becomes larger the conjugate length T can be made shorter and hence the device can be made more compact.

Further, a lens array is known in which semicylindrical lens portions are formed in transparent substrates. That is, in Japanese patent application Laid-Open No. 106503/1983 and as shown in FIG. 9, a transparent substrate 42a having a plurality of semicylindrical lens portions 44a whose center axes are parallel with each other, and another transparent substrate 42b of the same form having similar semicylindrical lens portions 44b, are put together such that the respective flat surfaces of the semi-cylindrical portions are arranged face to face and the respective axes of the lens portions of the two substrates are perpendicular to each other, so that a very small lens assembly body 46 is obtained with an optical axis which extends along the z axis in the direction perpendicular to each of the semi-cylindrical lens portions of the two substrates.

A problem exists with a rod lens array as shown in FIG. 5 in that when cylindrical lenses 32 are piled in a staggered relationship, a large number of lenses must be bundled with axes 34 parallel to each other with a required degree of accuracy, and further sandwiched or pressed by plates.

As a result, construction is difficult and time consuming. The array obtained according to the above-mentioned Japanese patent application Laid-Open No. 106503/1983 is of the two-dimensional surface type and a problem exists in that the optical axis is perpendicular to each of the axes of the semi-cylindrical lens portions of the two substrates so that a large numerical aperture cannot be obtained.

SUMMARY OF THE INVENTION

The present invention overcomes all of the problems described above with respect to the prior art by providing a lens made up of a number of different substrates each having a refractive index distribution pattern on it, and a method of producing such a lens. In accordance with the present invention, refractive index distribution patterns are formed on the surfaces of two substrates. The patterns are formed in the substrates to form the images. Then, the surfaces of the substrates with the patterns are placed against each other in such a manner that the two patterns coincide.

The patterns formed in the surface of the substrates may be constant in any direction parallel to the surfaces but vary in the direction normal to the surfaces. In fact, such patterns may be formed by substituting ions which alter the refractive index of the substrate for ions in opposite surfaces of this substrate. Then, the substrate may be cut along a plane parallel to the opposite surfaces. Finally, the surfaces with the ions disposed therein are positioned contiguous to each other. The result is a lens having an extremely large numerical aperture and a high refractive index difference. As a result, this lens is well suited to focus light from a source onto an optical fiber and thereby optimize coupling.

Alternately, a rod lens may be made by attaching a mask having an opening slit onto a glass substrate. Such patterns formed in the surfaces of the two substrates can resolve in the formation of semi-cylindrical lenses in the surfaces. Then, the surfaces of the two substrates are placed against each other with the axes of the semicylindrical lenses of one substrate being coincident with the axes of corresponding semicylindrical lenses in the other substrates so that the two substrates together form a series of rod lenses. In fact, ions may be diffused into opposite surfaces of one substrate and one surface of each of second and third substrates so that semicylindrical lenses are formed. The ions must be implanted so that the pattern of lenses of one surface of the first substrate matches the pattern of lenses formed on the surface of the second substrate, and the pattern of lenses formed on the other surface of the first substrate must correspond with the pattern of lenses formed on the first substrate. Then, the one surface of the first substrate is disposed contiguous with the treated surface of the second substrate, and the other surface of the first substrate is disposed contiguous with the treated surface of the third substrate so that axes of contiguous semicylindrical lenses coincide to form a series of rod lenses stacked two deep. This technique may be expanded to increase the number of stacked lenses.

The result is a rod lens array which is well suited for use in compact copying machines which simple to manufacture and at the same time has a large numerical aperture so that the length of the overall optical system may be shortened.

BRIEF DESCRIPTION OF THE DRAWINGS

These and other objects and advantages of this invention will become more apparent and more readily appreciated from the following detailed description of the embodiments, taken in conjunction with the accompanying drawings, of which.

DETAILED DESCRIPTION OF THE PRESENTLY PREFERRED EXEMPLARY EMBODIMENTS

Figure 10:
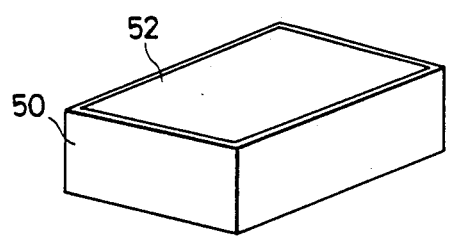
FIG. 10 is a perspective view showing a glass plate having four side surfaces masked in accordance with a first embodiment of this invention.
Figure 11:
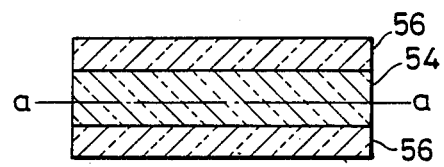
FIG. 11 is a side elevational sectional view of the glass plate of FIG. 10 after diffusion layers have been formed.
Figure 12:
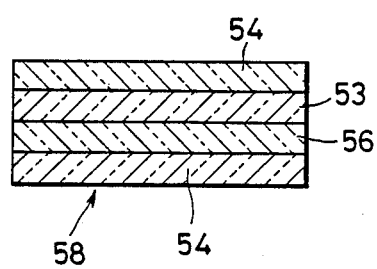
FIG. 12 is a side elevational sectional view of a slab-like lens body in accordance with the present invention developed from the glass plate of FIG. 11.
Figure 16:
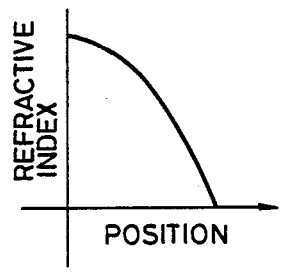
FIG. 16 is a diagram showing a refractive index distribution of a diffusion layer demonstrated in FIGS. 14 and 15.
Figure 17:
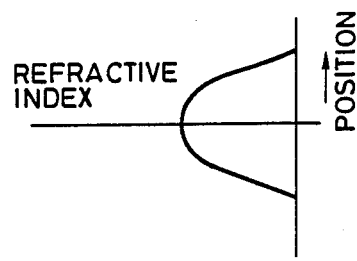
FIG. 17 is a diagram showing a refractive index distribution of a slab-like lens body demonstrated in FIG. 15.

FIGS. 10-12 show a first embodiment of this invention. As shown in FIG. 10, a mask layer 50 for preventing ions from diffusing is formed on four side surfaces of a glass plate 52, and glass plate 52 is immersed into fused salt composed of a nitrate or sulfate having ions of thallium, silver, or the like, bringing about a high refractive index, or a mixture of one of those salts and a salt having alkali ions. The ions are caused to uniformly diffuse through the glass surface with the fused salt as a diffusion source. As shown in FIG. 11, a pair of diffusion layers 56 are formed inwardly from the front and rear glass surfaces by the diffusion of ions. In each diffusion layer 56, the refractive index decreases along the direction of thickness from the front or rear surface as shown in FIG. 16. The thus arranged glass body is then cut along line a—a perpendicular to the direction of thickness of the glass body as shown in FIG. 11, the diffusion layer sides are ground, and ground surfaces are put together as shown in FIG. 12. The result is a slab lens 58 of the unidirectional gradient refractive index type having a refractive index distribution only in the direction perpendicular to a reference surface, that is the diffusion surface, as shown in FIG. 17.

Figure 13:
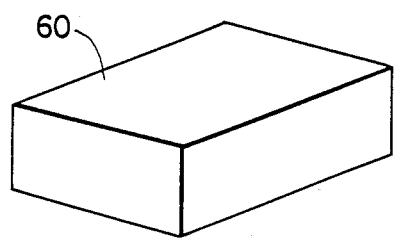
FIG. 13 is a perspective view showing a glass plate used in accordance with the second embodiment of the present invention.
Figure 14:
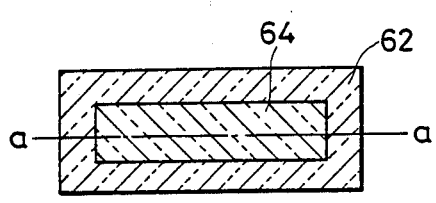
FIG. 14 is a side elevational sectional view showing diffusion layers formed in the glass plate of FIG. 13.
Figure 15:
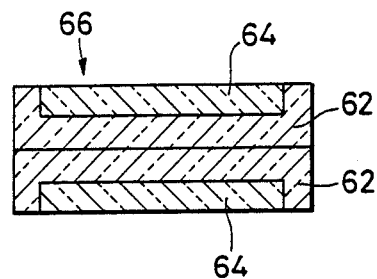
FIG. 15 is a side elevational sectional view showing a slab-like lens body produced in accordance with the present invention from the glass plate of FIG. 14.

FIGS. 13-15 show a second embodiment in which a diffusion layer 62 is formed by immersing a glass plate 60, as it is shown in FIG. 13, without forming such a mask layer, into an ion diffusion liquid so as to diffuse ions uniformly through the entire circumference of glass plate 60. As shown in FIG. 14, diffusion layer 62 is formed to have a predetermined thickness extending inwardly from each surface. Then, the glass is cut along the a—a line of FIG. 14, ground at the surfaces of the sides with diffusion layer 62, and the ground surfaces are put together face to face to form a slab lens 66 as shown in FIG. 15. Also in this second embodiment, the result is a unidirectional refractive index distribution type having a refractive index distribution only in the direction perpendicular to a reference surface, that is the diffusion surface, as shown in FIG. 17.

Figure 18:
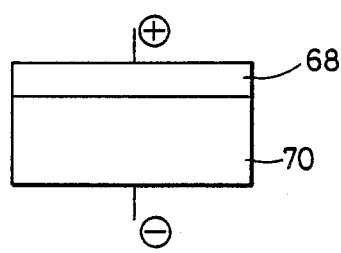
FIG. 18 is a side view showing a diffusion layer formed by applying a voltage.

Alternatively, a slab lens similar to those described with respect to FIGS. 10-15 may be formed by applying a D.C. voltage in the direction of thickness of a glass body while it is immersed in the ion diffusion liquid as illustrated in FIG. 18. A diffusion layer 68 is formed only on one side opposite non-diffused glass 70, and a pair of the thus prepared glass bodies are put together face to face as shown in FIG. 12 to thereby obtain a slab lens similarly to the above-mentioned case.

The lenses of the embodiments of FIGS. 10-18 for coupling light from a source into an optical fiber 3 since these lenses may have a large numerical apperture.

Figure 19:
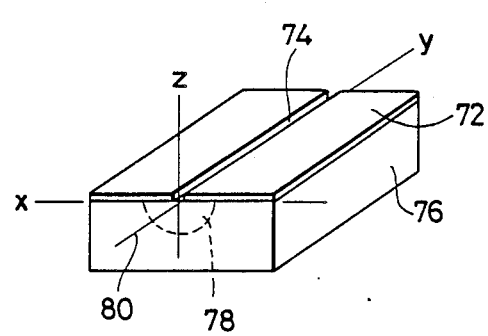
FIG. 19 is a perspective view showing a manufacturing step of a semi-cylindrical lens portion in accordance with a third embodiment of the present invention.
Figure 20A:
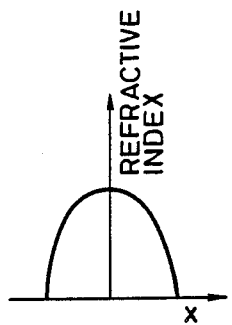
FIGS. 20A and 20B are diagrams showing a refractive index distribution of the semi-cylindrical lens portion of FIG. 19.
Figure 20B:
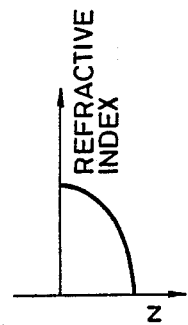

The steps of manufacturing a semi-cylindrical lens portion of the refractive index distribution type according to a third embodiment of the present invention will be described. In FIG. 19, a mask layer 72 having a slit 74 of predetermined width is formed on a transparent substrate 76. Mask 72 allows ions to pass through only slit 74 and not through mask 72 itself. Ions are diffused through slit 74 into transparent substrate 76 with a diffusion source of fused salt, such as a nitrate or sulfate with ions of, for example, thallium, silver, or the like, for causing a large refractive index, or a mixture of one such salt as described above and salt having alkali ions. The result is an elongated semi-cylindrical lens portion 78 extending along an axis which is a longtitudinal center line 80 of slit 74. Assuming that axis 80 on the surface of transparent substrate 76 is the Y-axis, and that the directions respectively perpendicular to the Y-axis are the X- and Z-directions, lens portion 78 has a refractive index distribution as illustrated in FIGS. 20A and 20B in which the refractive index changes radially from axis 80.

Figure 21:
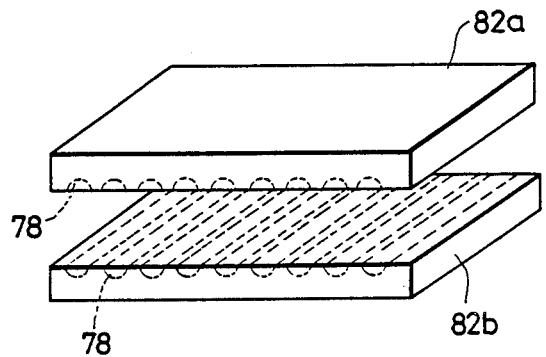
FIG. 21 is a perspective view showing a manufacturing step of a refractive index distribution rod lens array according to the third embodiment of the present invention.
Figure 23:
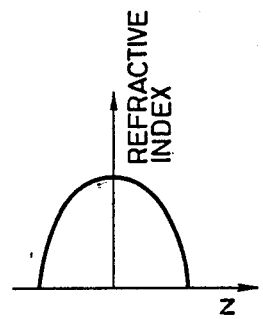
FIG. 23 is a diagram showing a refractive index distribution of the lens portion of the lens array of FIG. 22.
Figure 22:
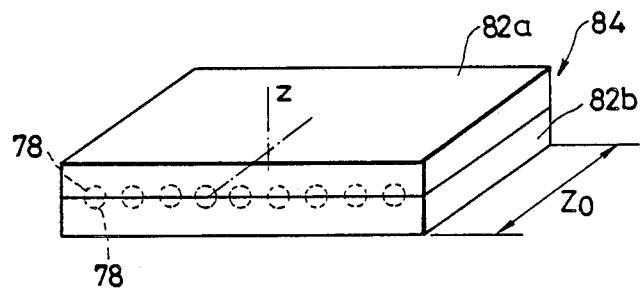
FIG. 22 is a perspective view showing a finished lens array according to the third embodiment of the present invention.

As illustrated in FIG. 21, a transparent substrate 82a formed, in its surfaces, with a plurality of semi-cylindrical lens portions 78 extending along straight lines parallel to each other and another transparent substrate 82b similarly formed with a plurality of matching semi-cylindrical lens portion 78. Substrates 82a and 82b are prepared in a manner similar to that described above. Substrates 82a and 82b are then disposed such that the flat portions of each of semi-cylindrical lens portions 78 of the two substrates is made to face a corresponding lens portion in the other substrate, respectively, as shown in FIG. 21. Then substrates 82a and 82b are put together as shown in FIG. 22, so that a refractive index distribution type rod lens array 84 is formed. Lens array 84 is a one dimensional array having optical axes which are the axes of the respective cylindrical lens bodies each formed by a pair of semi-cylindrical lens portions 78. The cylindrical lens bodies each have a refractive index distribution in the Z-direction as shown in FIG. 23, and lens array 84 has an advantage that the numeral aperture is large and the conjugate length is short.

Figure 1:
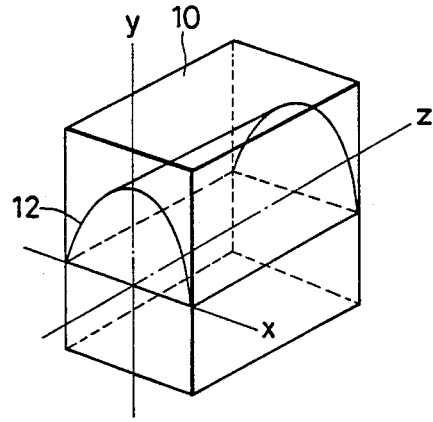
FIG. 1 is a perspective view showing a conventional slab-like lens body shown in a diagramatic manner along with its refractive index distribution.
Figure 2:
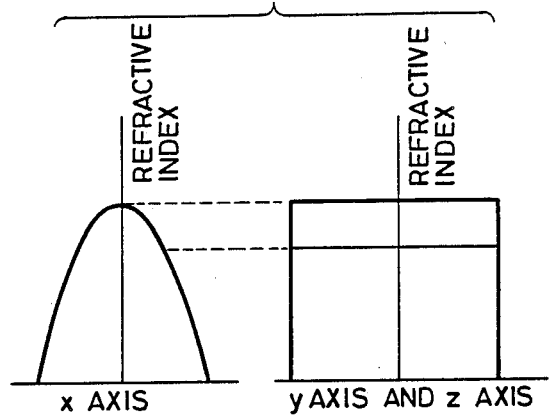
FIG. 2 is a diagram showing a refractive index distribution in the x, y and z directions of the lens of FIG. 1.
Figure 3:
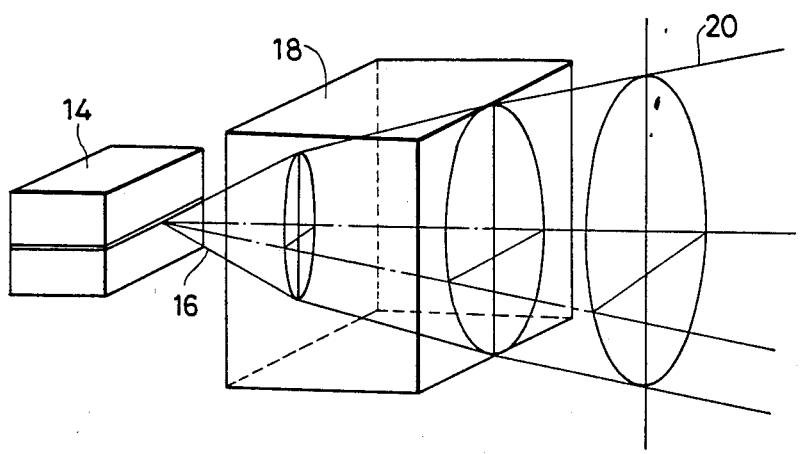
FIG. 3 is a perspective view showing the operation of a conventional slab-like lens body for collecting a beam whose radiation angle differs with direction.
Figure 4:
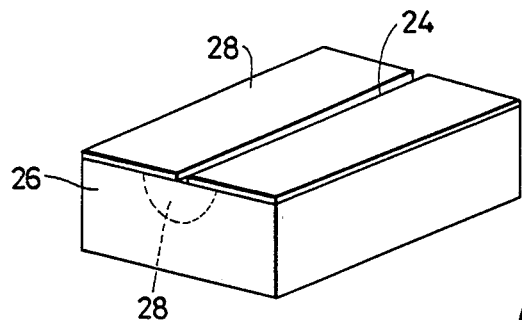
FIG. 4 is a perspective view showing a well known technique for producing a semi-cylindrical lens portion by a surface diffusion method.
Figure 5:
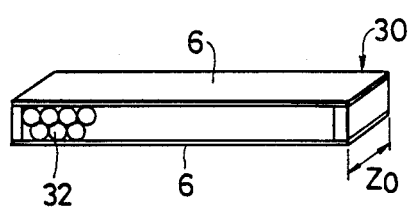
FIG. 5 is a perspective view showing a conventional gradient refractive index type rod lens array.
Figure 6:
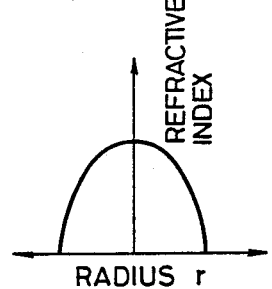
FIG. 6 is a refractive index distribution diagram for each rod lens in the array of FIG. 5.
Figure 7:
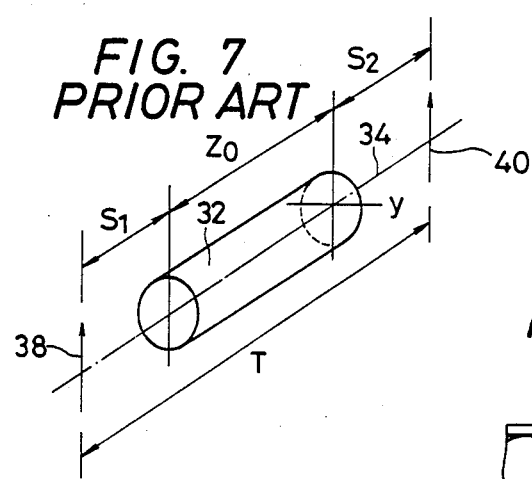
FIG. 7 is a perspective view showing one of the rod lenses of the array of FIG. 5.
Figure 8:
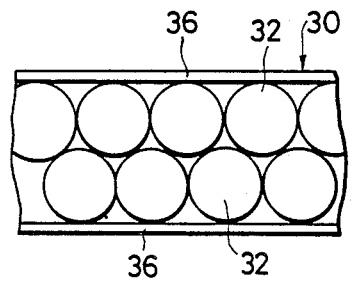
FIG. 8 is an enlarged front elevational view showing the lens array of FIG. 5.
Figure 9:
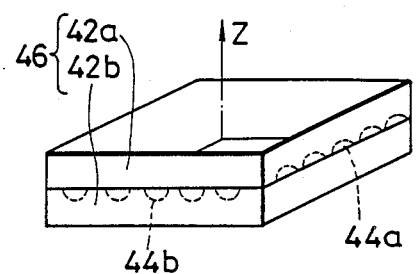
FIG. 9 is a perspective view showing a conventional lens array using semi-cylindrical lens bodies.
Figure 24:
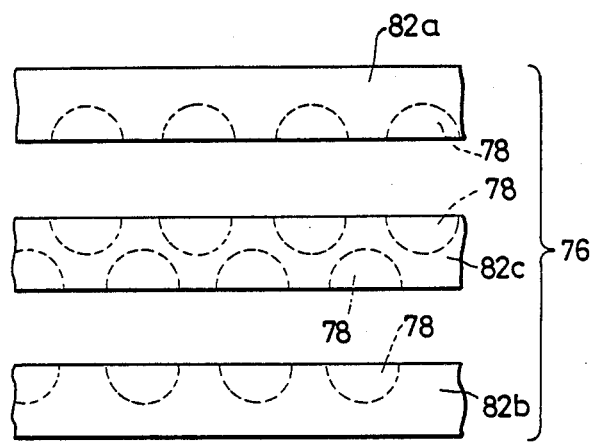
FIG. 24 is a front elevational view showing a manufacturing step of a fourth embodiment according to the present invention.
Figure 25:
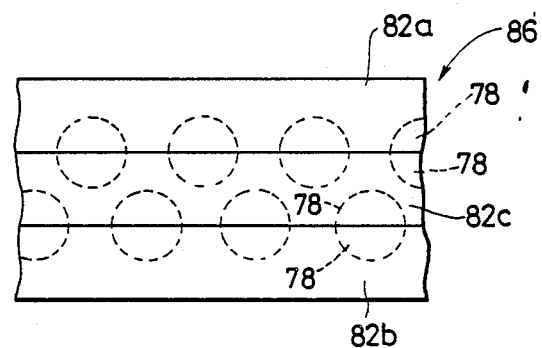
FIG. 25 is a front elevational view of the lens array manufactured in accordance with the fourth embodiment of the present invention.

FIGS. 24 and 25 show another embodiment in which substrates 82a and 82b, each having a plurality of semicylindrical lens portions 78 on their surfaces, are disposed face to face but separately from each other by a further transparent substrate 82c. Substrate 82c has a plurality of matching semi-cylindrical lens portions 78 formed on opposite surfaces with portions 78 on one surface shifted with respect to portions 78 on the other surface. Substrates 82a, 82b and 82c are put together so that the axes of semi-cylindrical lens portions 78 in opposition to each other are made coincident with each other so as to form a lens array 86 as shown in FIG. 7. This lens array not only has a large numerical aperture and a short conjugate length similarly to the case as described with respect to FIGS. 19-23, but also is a double-row lens array having optical axes which are the axes of the cylindrical lens bodies formed at upper and lower rows in the array. Further, a lens array having a plurality of rows can be produced by putting together four of more substrates in the same way as described above.

EXAMPLE 1

A plate-like glass body of 20×20×5 mm made of optical glass TiF6 was immersed in fused salt which contained 40% of AgNO3 and 60% of KNO3 by weight and which was heated to 320° C., so as to be treated for 96 hours. The surfaces were polished and then the glass body was cut in the direction perpendicular to the thickness. Then, the polished surfaces were put together so that the diffusion layers contact each other. A slab lens having a refractive index difference of 0.22, a "g" value of 0.432 mm$^{-1}$ when determined in accordance with the abovementioned equation of refractive index and a numerical aperture of 0.76 could be obtained.

EXAMPLE 2

Glass containing 48% of $P_2O_5$, 20% of $Na_2O$, 9% of $K_2O$, 5% of $TiO_2$, 10% of $Nb_2O_5$ and 8% other materials by weight was worked into a plate-like body of 120×120×5 mm. The plate-like body was immersed in fused salt which contained 40% of AgNO3 and 60% of KNO3 by weight and which was heated to 320° C., so as to be treated for 48 hours. The surfaces were polished and then the glass body was cut in the direction perpendicular to the thickness. Then the polished surfaces were put together so as to make the diffusion layers be in contact with each other. The result was a slab lens having a refractive index difference of 0.21, a "g" value of 0.534, when determined in accordance with the above-mentioned equation and a numerical aperture NA=0.96 or more.

EXAMPLE 3

After a Ti film of a 2μ thickness provided with a plurality of grooves each having a 0.38 mm width was formed on a surface of a glass plate made of an optical glass of TiF6, the glass plate was immersed in fused salt of a acid mixture of 30% AgNO3 and 60% KNO3 (by weight) heated to 350° C., so as to be treated therein for 50 hours. Then, the surface was polished and the Ti film was removed, thereby obtaining a glass plate having a plurality of semi-cylindrical lens portions each having a 0.7 mm diameter. This glass plate was cut into pieces perpendicularly to the axes of the semi-cylindrical lens portions. Two of the cut pieces were put together face to face such that the axes of the semi-cylindrical lens portions were made coincident to each other, as shown in FIG. 22, so that a refractive index distribution type rod lens array with its length $Z_o$ of 5.5 mm capable of projecting an erect real image could be obtained.

As described above, according to the present invention, a slab lens having a large refractive index difference, formed by a surface diffusion/introduction method, can be used as it is formed, so that it is not only easy to manufacture but to freely select in the direction perpendicular to the length of the lens.

Also, according to the present invention, two substrates may be put together face to face such that the respective axes of a pluarlity of semicylindrical lens portions formed in the two transparent substrates coincide with each other, whereby a lens array having a large numeral aperture and a short conjugate length can be easily manufactured.

However, only several embodiments of this invention have been described in detail above. Those skilled in the art may readily appreciate that many modifications are possible without departing from the novel teachings and advantages of this invention. Accordingly, all such modifications to the preferred embodiments are intended to be included within this invention as defined by the following claims.

What is claimed is:

1. A refractive index distribution lens comprising:
   one substrate having a refractive index distribution pattern formed in its surface; and
   at least another substrate having a refractive index distribution pattern formed in a surface, said surface of said one substrate and said surface of said another substrate being contiguously disposed, said pattern in said one substrate coinciding with said pattern in said another substrate.

2. A lens as in claim 1 wherein said patterns in each said one substrate and each said another substrate form refractive index distribution semi-cylindrical lenses, the axes of said semi-cylindrical lenses in said one substrate being contiguous with axes of said semi-cylindrical lenses in said another lens.

3. A lens as in claim 1 wherein said patterns in said one substrate and said another substrate each are constant in directions parallel to said surfaces and vary in directions perpendicular to said surfaces.

* * * * *